SWITCH APPARATUS EMPLOYING COATED PIEZOELECTRIC CRYSTAL

Filed June 1, 1964 3 Sheets-Sheet 1

WILLIAM H. KING, JR.
JAMES A. WILSON
INVENTORS

BY David A. Roth

PATENT ATTORNEY

Sept. 19, 1967 W. H. KING, JR., ET AL 3,343,044

SWITCH APPARATUS EMPLOYING COATED PIEZOELECTRIC CRYSTAL

Filed June 1, 1964 3 Sheets-Sheet 2

WILLIAM H. KING, JR.
JAMES A. WILSON
INVENTORS

BY David A. Roth

PATENT ATTORNEY

WILLIAM H. KING, JR.
JAMES A. WILSON
INVENTORS

BY David A. Roth

PATENT ATTORNEY

United States Patent Office
3,343,044
Patented Sept. 19, 1967

3,343,044
SWITCH APPARATUS EMPLOYING COATED PIEZOELECTRIC CRYSTAL

William H. King, Jr., Florham Park, and James A. Wilson, Stanhope, N.J., assignors to Esso Research and Engineering Company, a corporation of Delaware
Filed June 1, 1964, Ser. No. 371,720
2 Claims. (Cl. 317—146)

ABSTRACT OF THE DISCLOSURE

A switch apparatus is disclosed which employs a piezoelectric crystal with a suitable substrate (e.g. lithium chloride) as the control element.

This invention relates to oscillating systems containing piezoelectric crystals which are used as simple off-on control switches. In particular, the invention relates to coated piezoelectric crystals which are in oscillating circuits which are so adjusted as to allow the oscillating circuit to operate or not operate in accordance with the amount of material interacted with the crystal coating. The operation or nonoperation of the circuit activates a relay or similar switching device.

It is disclosed in commonly assigned copending application S.N. 110,189, now U.S. Patent No. 3,164,004, that circuits controlled by piezoelectric crystals can be used as extremely sensitive analyzers by coating the crystal with a coating material which will selectively interact with a material to be detected. The amount of material interacting is measured by the change of frequency of the crystal and its associated circuit, as the amount of material interacting with the coating changes from time to time. The more material picked up by the coating on the crystal, the less the frequency, and vice versa.

By interact, interaction, etc. in this application, is meant any physical or chemical relationship between the coating and the material which will tend to increase the resistance of the crystal to the electric driving force of the oscillating circuit. Interaction can be absorption, adsorption, chemisorption, chemical reactions, etc.

The present invention makes use of the sustained oscillation stability limits in a coated piezoelectric-controlled oscillating circuit which results in a simple, off-on switching circuit responsive to the concentration of a particular fluid material in the presence of the piezoelectric crystal. In operation the coated crystal in the oscillating circuit is preset, or adjusted, to be near the point of oscillation failure for a given crystal coating condition.

Therefore, when sufficient additional material is interacted with the coating of the crystal, the oscillation of the circuit will stop, thus causing the cessation of current flow in said circuit which thereby actuates a relay which, in turn, can control the amount of gaseous component in the region of the piezoelectric crystal. Thus, the apparatus of the invention can be useful for control of poisonous compounds or any other compounds whose presence, or lack of presence, it is desired to control as it can be made very sensitive to their first appearance in a system.

For instance, it is clear that the apparatus would be extremely useful to control the generation of metal carbonyls, $H_2S$, CO, $H_2O$, and the like. The control system of the invention is arranged so that a relay is actuated either on or off when the coated crystal is in the presence of a certain amount of a particular component or goes on or off when a certain component disappears sufficiently from the environment of the coated crystal.

The simplest circuits can be designed to be at the desired increment away from the point of oscillation failure without any requirement for further adjustment. This increment away from the point of oscillation failure is referred to herein as the set point. The more sophisticated circuits can be provided with variable circuit elements such as condensers, resistors, inductors, and the like, in series or parallel with the coated crystal element to adjust set points as may be desired to meet any particular environmental condition. Also, the temperature of the oscillator tube filaments and the like can be changed to control the set point as well. The temperature of the gaseous environment surrounding the crystal can also be changed to control the set point.

As indicated above, the increase in mass on the surface of the crystal can also come about due to a chemical reaction. For instance, if the coating is a platinum catalyst, the actuating gas would be either $H_2$ or $O_2$ as it forms water.

Generally, any type of crystal which can be used in a piezoelectric oscillating electronic circuit is suitable for use in this invention.

A substrate (coating) is placed on the crystal in rather small amounts which can be varied according to the sensitivity of the coating to the material which interacts with the coating. Some of these materials, such as deliquescent materials, adsorb many times their weight of water and, therefore, relatively small amounts of substrate can be used. Other materials pick up relatively lesser quantities of material per weight of coating. Therefore, commensurately larger amounts of coating will generally be used.

Suitable deliquescent materials when the off-on switch is to be actuated with water vapor include lithium chloride, calcium chloride, potassium fluoride, LiBr, LiI, $LiNO_3$, calcium nitrate, and the like. Hydroscopic materials, such as polyelectrolytes, natural resins, gels, cellulose products, glues, and the like, can also be used but somewhat greater quantities of such hydroscopic materials must be used as compared with deliquescent materials.

Details of crystals, coating, and various coatings (substrates) which can be used for different gaseous components are not the inventive feature of this application. They are set forth in copending, commonly assigned Serial No. 110,189, now U.S. Patent 3,164,004, Serial No. 231,971, and Serial No. 232,742, now U.S. Patent 3,260,104, which are herein incorporated in their entirety by reference.

The invention can be fully understood by referring both to the preceding and the following description, the claims taken in conjunction therewith and by the accompanying drawings wherein:

In general, the circuits illustrated in FIGURES 1, 2, 4 and 5, use a single vacuum tube or transistor and take advantage of the fact that the radio frequency voltage output drops much faster than the grid current. This results in an excellent cutoff characteristic which is desirable for an on-off device.

Figure 1:
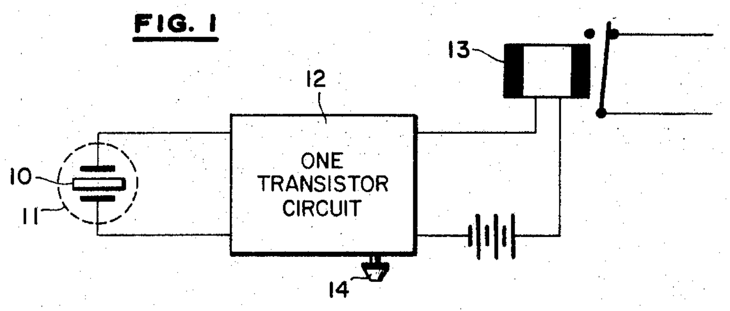
FIGURE 1 is a block schematic diagram of one embodiment of the apparatus of the invention wherein a transistor circuit is used.

Now turning to FIGURE 1, LiCl-coated crystal 10 is located within porous shield 11. Crystal 10 is electrically connected to a one transistor circuit 12 shown as a block diagram. Relay 13 is electrically connected to transistor circuit 12 and a humidity control circuit (not shown). Set point knob 14 is connected to a variable element within the transistor circuit 12 such as a capacitance, resistance, etc.

In operation, the set point is coarsely adjusted by the quantity of hygroscopic material, e.g., LiCl on the crystal. It is finely adjusted by turning the set point knob so that the circuit will damp out when additional water is adsorbed by the crystal coating. The thickness of the film will be generally selected depending on the circuit, humidity level, and the like but for deliquescent inorganic salts will generally be in the order of 50 to 2000 A. preferably 100 to 1000 A.

Figure 2:
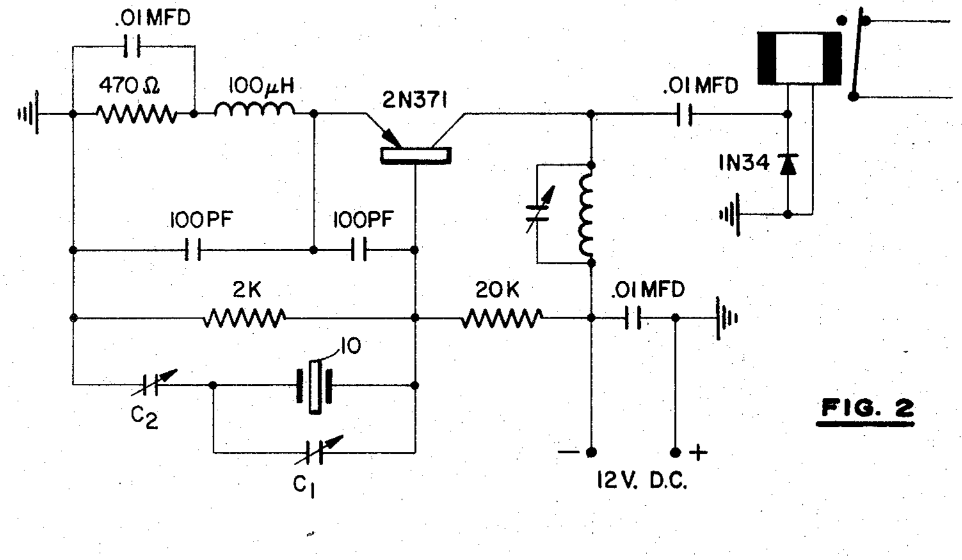
FIGURE 2 is a detail of the particular transistor circuit illustrated in FIGURE 1 showing the oscillating circuit and the connection of the relay with the oscillating circuit.

FIGURE 2 shows the detail of a typical transistor oscillator circuit. In this circuit the base and emitter are connected in a modified Pierce arrangement. The collector circuit is tuned to the fundamental or any harmonic of the crystal which provides the RF needed for the relay circuit. $C_1$ or $C_2$ can have varying capacitances from 10 to 100 pf. and either, or both, can be varied to adjust the set point.

Figure 3:
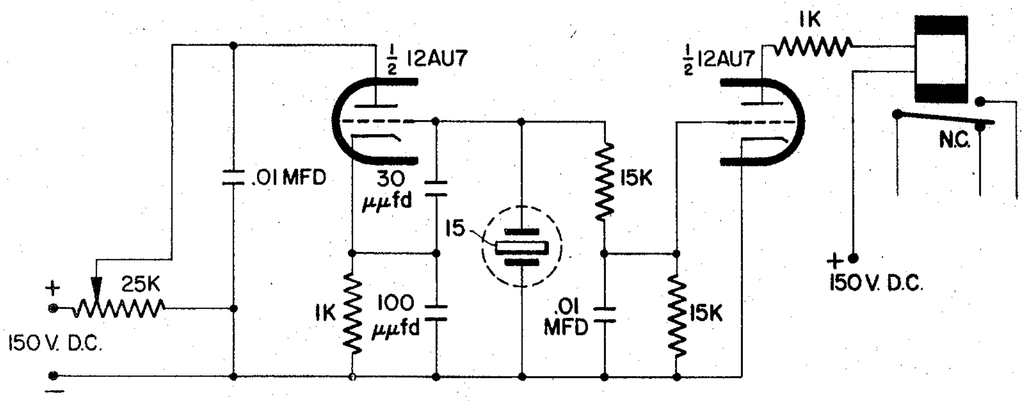
FIGURE 3 is another circuit type embodying the invention showing an on-off circuit where conventional tubes are used. This circuit uses the loss of grid bias to trigger a relay at the point of oscillation failure.

Turning now to FIGURE 3, the crystal oscillator is a triode (double triode 12 AU7) operating in a modified Pierce crystal oscillator configuration. Plate voltage is supplied from a positive supply (marked −150) connected across the 25K POT. The 25K POT serves as a means for varying the plate voltage.

The negative side of the plate supply is connected to the common (may be designated as ground) return for all RF connections. The 0.01 mfd. capacitor from the oscillator plate to the common provides a low impedance radiofrequency path without conducting, DC voltage.

From an RF standpoint, the plate is at the common potential or is connected to one side of the crystal. The 30 $\mu\mu$fd. and 100 $\mu\mu$fd. capacitors across the crystal form a tap and path for the circulating RF current produced by the oscillating reactive element, the coated crystal 15.

The connection to the cathode at the junction of the two capacitors provides a feedback path which allows the crystal to alternately be driven by the vacuum tube plate circuit or drive the tube grid circuit. The 1K resistor in the cathode circuit provides a DC path for current to flow to the cathode and represents a high enough RF impedance so as not to provide an RF short circuit. (The 1K is shunted by 100 $\mu\mu$fd. which represents 160 ohms at 9 mc.)

The grid of the vacuum tube acts as a half wave rectifier when driven by the AC voltage from the crystal circuit. Its rectifying action prevents any large excursion of voltage in a position direction between the grid and cathode.

Full negative voltage swings occur resulting in a net flow of current with a negative sign through the two 15K grid resistors. The 15K resistor nearest the oscillator grid provides a DC path without allowing RF current to flow which would upset the crystal circuit. The 0.01 mfd. across the second 15K resistors prevents any RF from reacting the grid of the relay tube.

The voltage developed across the second 15K resistor appears as negative bias for the relay tube grid due to the grid current of the oscillator. The relay tube is a triode having a positive plate supply voltage. The plate current of this tube flows through the plate relay. The 1K resistor shown in series with the plate connection may be omitted.

As long as there is enough negative voltage across the second 15K resistor the relay tube plate current will be so low as not to actuate the relay and the normally closed relay contacts will remain closed.

Failure of the crystal to oscillate will cause loss of grid bias on the relay tube and result in relay operation.

Varying the plate supply voltage to the crystal oscillator changes the overall gain (or sensitivity of the circuit). Higher plate voltage provides more gain and drive allowing the crystal to be in a less efficient operating state (due to $H_2O$) and affords a control of the oscillator "Failure" point. For example, a preferred voltage to cause oscillation of a relatively dry coated crystal is 11 to 12 volts. When the coated crystal is in a very high humidity environment the voltage necessary to cause oscillation can be in the order of 25 volts. If this is not available, the oscillation of the circuit will cease.

Figure 4:
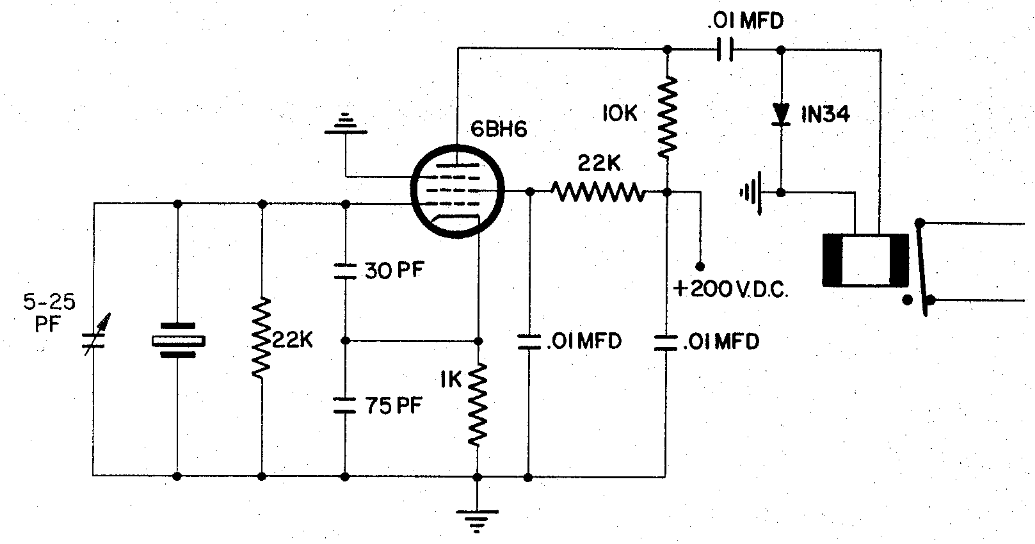
FIGURE 4 is a schematic of another preferred embodiment of a circuit that can be used for on-off humidity (water) or other material control. The term XTAL used in this circuit and the others of this specification refer to the coated crystal unless otherwise indicated.

FIGURE 4 shows circuit for another embodiment of this invention. In this circuit a wider range and sharper cutoff can be obtained if the 1K resistance element is a choke and the 10K resistance element is a tank circuit tuned to the coated crystal.

The invention is further illustrated by the following example.

*Example*

Figure 5:
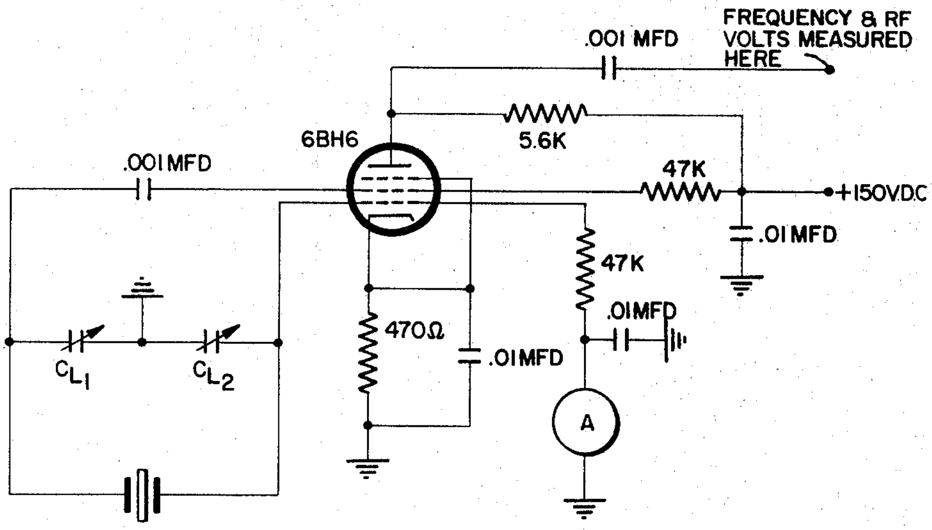
FIGURE 5 is a schematic of a circuit for carrying out this invention that was used to obtain the data of the example.

The circuit which is illustrated schematically in FIGURE 5 was used as a standard test circuit to obtain data on the operation of the on-off principle of the invention. The circuit is an electron coupled Pierce oscillator and is used widely in many kinds of communications equipment. The control grid and screen grid function the same way as a grid and plate in a triode Pierce oscillator. The oscillating electron stream produced by the Pierce oscillator is transferred to the plate of the tube with very little interaction (so-called electron coupled).

The circuit utilized an LiCl coated piezoelectric crystal (shown as XTAL in the drawing). The load capacity was changed by changing both $Cl_1$ and $Cl_2$ and measuring stray and tube capacities together.

The data obtained at two differing load capacities using the circuit apparatus of FIGURE 5 is summarized below in Table I.

TABLE I

[$\Delta F_0$=1 kc LiCl aged 6 months at 50 %RH with no change]

| Sample Gas, Percent Relative Humidity | 32 pf. Load Capacity | | | 10 pf. Load Capacity | | |
|---|---|---|---|---|---|---|
| | Frequency, kcs. | Grid, $\mu$a. | Plate, A.C. Volts | Frequency, kcs. | Grid, $\mu$a. | Palte, A.C. Volts |
| Dry | 9008.841 | 61 | 1.12 | 9012.938 | 141 | 1.24 |
| 18 | 9007.420 | 39 | 1.08 | 9011.530 | 111 | 1.20 |
| 36 | 9006.750 | 14 | 0.97 | 9010.860 | 71 | 1.17 |
| 43 | 9006.640 | 7.0 | 0.87 | 9010.720 | 61 | 1.15 |
| 47 | 9006.460 | 3.0 | 0.76 | 9010.575 | 53 | 1.13 |
| 50 | Stopped Oscillating | | | 9010.417 | 44 | 1.12 |
| 55 | Out | 0 | 0 | 9010.204 | 33 | 1.09 |
| 60 | Out | 0 | 0 | 9010.058 | 27 | 1.07 |
| 63 | Out | 0 | 0 | 9009.845 | 16 | 1.00 |
| 67 | Out | 0 | 0 | 9009.696 | 7 | 0.90 |
| 71 | Out | 0 | 0 | Out | 0 | 0 |

The crystal used was $\frac{5}{16}$" gold electrode at cut quartz piezoelectric crystal obtained from Reeves-Hoffman Co., Carlisle, Pa. Lithium chloride was deposited on the electrode on each side by a vacuum evaporation technique. Sufficient LiCl was deposited on each side of the crystal to reduce the frequency of the crystal 500 cycles per second on each side. Thus, the total frequency decrease of the crystal after coating was about one kilocycle per second. The coated crystal retains its sensitivity over a relatively long time. For instance, the coated crystal was six months old when the data here were obtained, but the data were substantially identical with that obtained when the crystal had been newly coated.

The data from Table I and additional data using a 15 pf. load capacity were plotted on a graph of grid current and RMS voltage against percent relative humidity. The graph is shown in FIGURE 6.

Figure 6:
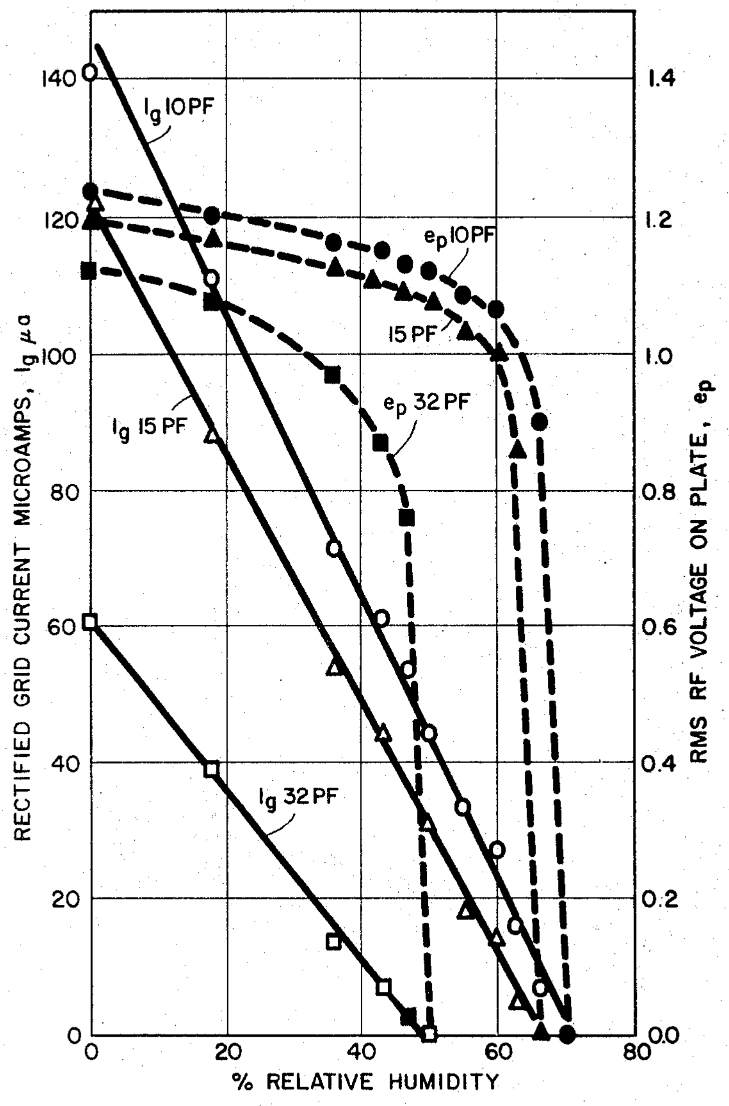
FIGURE 6 is a graph of grid current and RMS RF voltage on plate vs. percent relative humidity plotting data of Table I of the example as well as equivalent data for a 15 pf. circuit.

It can be seen from FIGURE 6 that at various relative humidities both the plate voltages and the grid current will become 0. This can, in turn, activate a relay to either the on or off position, depending on the particular control desired. The fact that the plate voltage drops more sharply than the grid current should be noted. Also, the effect of load capacitance on the cutoff point is apparent.

Although the invention has been described with some degree of particularity, it will be understod that numerous variations in details and construction are contemplated and are within the scope of the invention as claimed in the following claims.

What is claimed is:

1. An off-on switch apparatus responsive to a fluid material comprising in combination electronic circuit oscillating means having as a control element thereof a piezoelectric crystal having a coating thereon, said coating being selected from the group consisting of lithium chloride, calcium chloride, LiBr, LiI, $LiNO_3$, $Ca(NO_3)_2$, and combinations thereof and said coating being adapted so as to be capable of interacting with at least one component of said fluid material to thereby cause a substantial change in oscillation, and relay means electrically connected to said electronic circuit oscillating means, said electronic circuit oscillating means being so adapted as to actuate said relay means in response to said substantial change in oscillation.

2. An apparatus as defined by claim 1 wherein said electronic circuit oscillating means contains a variable circuit element.

References Cited

UNITED STATES PATENTS

| | | | |
|---|---|---|---|
| 2,496,975 | 2/1950 | Bach | 310—8.9 X |
| 2,794,132 | 5/1957 | Zapponi | 310—8.9 |
| 3,164,004 | 1/1965 | King | 73—336.5 X |
| 3,253,219 | 5/1966 | Littler | 310—8.2 X |
| 3,260,104 | 7/1966 | King | 73—23 |
| 3,266,291 | 8/1966 | King | 73—23 |

MILTON O. HIRSHFIELD, *Primary Examiner.*

J. A. SILVERMAN, *Assistant Examiner.*